United States Patent
Roeckel et al.

(10) Patent No.: US 6,820,479 B2
(45) Date of Patent: Nov. 23, 2004

(54) DEVICE FOR DETERMINING AT LEAST ONE PARAMETER OF A FLOWING MEDIUM

(75) Inventors: Herbert Roeckel, Ditzingen (DE); Erhard Renninger, Markgroeningen (DE); Hans Hecht, Korntal-Muenchingen (DE); Gerhard Hueftle, Aspach (DE); Manfred Strohrmann, Karlsruhe (DE); Rainer Schard, Esslingen (DE); Roland Wanja, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 10/089,258

(22) PCT Filed: Jul. 20, 2001

(86) PCT No.: PCT/DE01/02761

§ 371 (c)(1),
(2), (4) Date: Sep. 3, 2002

(87) PCT Pub. No.: WO02/08701

PCT Pub. Date: Jan. 31, 2002

(65) Prior Publication Data

US 2003/0037610 A1 Feb. 27, 2003

(30) Foreign Application Priority Data

Jul. 26, 2000 (DE) .......................................... 100 36 290

(51) Int. Cl.$^7$ .............................................. G01F 1/08
(52) U.S. Cl. ................................. 73/202.5; 73/204.26
(58) Field of Search ................................ 73/202, 202.5, 73/204.21, 204.22, 204.26

(56) References Cited

U.S. PATENT DOCUMENTS

| | | | |
|---|---|---|---|
| 4,843,882 A | | 7/1989 | Ohta et al. |
| 5,452,610 A | | 9/1995 | Kleinhans et al. |
| 5,693,879 A | * | 12/1997 | Rilling et al. ............ 73/204.26 |
| 5,723,784 A | | 3/1998 | Lembke et al. |
| 6,253,606 B1 | * | 7/2001 | Yonezawa et al. ....... 73/204.26 |

FOREIGN PATENT DOCUMENTS

| | | |
|---|---|---|
| DE | 43 38 891 | 9/1994 |
| DE | 44 26 102 | 1/1996 |
| DE | 44 41 874 | 5/1996 |
| DE | 195 24 634 | 1/1997 |
| DE | 196 23 334 | 12/1997 |
| DE | 196 43 996 | 5/1998 |
| DE | 198 28 629 | 2/1999 |
| DE | 197 43 409 | 4/1999 |
| DE | 197 44 997 | 4/1999 |
| DE | 199 57 437 | 7/2000 |
| EP | 1 065 476 | 1/2001 |
| EP | 1 105 699 | 6/2001 |
| EP | 1 123 487 | 8/2001 |

* cited by examiner

*Primary Examiner*—Harshad Patel
(74) *Attorney, Agent, or Firm*—Kenyon & Kenyon (57) ABSTRACT

A device includes a sensor carrier, on which is arranged a sensor element introduced into the flowing medium. The sensor carrier is produced separately, and the at least one sensor element may be inserted immediately into the sensor carrier. For example, the sensor carrier is mounted on a component of the device by adhesive.

24 Claims, 6 Drawing Sheets

DEVICE FOR DETERMINING AT LEAST ONE PARAMETER OF A FLOWING MEDIUM

FIELD OF THE INVENTION

The present invention is based on a device for determining at least one parameter of a medium flowing in a line, including a sensor carrier for accommodating a sensor element.

BACKGROUND INFORMATION

German Published Patent Application No. 44 26 102 and U.S. Pat. No. 5,693,879 describe a sensor carrier for a sensor element in an air-mass measuring device, the sensor carrier extending with the sensor element into a measuring channel in which a medium is flowing. The sensor element supplies a measuring signal used for calculating the mass of the flowing medium. The sensor carrier has a recess in which the sensor element is flush-mounted and retained by an adhesive layer applied on a bottom surface of the recess. In this case, the sensor carrier is produced in that first of all, an opening which corresponds approximately to the outer shape of the sensor element is made in a metal strip. The metal strip is thereupon bent about a bending axis outside of the recess and then pressed together so that a bent part of the metal strip forms a retaining element, and an unbent part of the metal strip having the opening forms a frame element of the sensor carrier. The retaining element covers the opening of the frame element and, together with the frame element, forms a recess. After that, further deforming of the retaining element produces plateau-like elevations which are used as spacers or bearing surfaces. The sensor element is then glued in place in the recess.

It is extremely important that the sensor element be glued in position in the recess with its top surface as flush as possible with respect to the top surface of the sensor carrier, since just the smallest displacement, e.g., because of an unevenly applied adhesive layer, results in eddies and flow separation regions which, particularly at the surface of the sensor element, disadvantageously influence the heat dissipation of the measuring resistor and invalidate the measuring result. Therefore, very small mass tolerances must be provided for the recess, and the most extreme care is necessary when gluing the sensor element into the recess of the sensor carrier, so that particularly when the device is mass-produced, a high degree of sophistication is necessary from a standpoint of production engineering, resulting in considerable production costs.

The various work steps for producing the frame and retaining elements are disadvantageous. In addition, the flowing medium may flow through the folding gap between the frame and retaining elements. However, this is not disadvantageous, since this effect may be suppressed by zero-point measuring and calibration. Although, during the service life of the sensor element, the measuring result is invalidated if this folding gap is obstructed by dirt and/or liquid particles, and the calibration is no longer correct.

It is disadvantageous that the spacers are first formed by a further shaping process. The tolerance of the depth dimension of the recess is given by the tolerance of the thickness of the metal strip and the tolerance of the folding gap thickness.

It is also disadvantageous that, because of the flowing corrosive medium, a corrosion-protection layer such as NiNiP must be applied on the sensor carrier by an additional costly electroplating process or a coating method which further increases the dimensional tolerances and the production times and costs.

When working with such a self-supporting manner of mounting the sensor element, because of tolerances during production, a gap develops between the sensor element and the recess of the sensor carrier. The gap may be so large that in the case of the sensor element, an unwanted flow in the hollow space below its membrane in the recess may come about, which has a disadvantageous effect on the measuring result of the device.

That is why devices are described with which the disturbing influence of the seepage may be reduced. A diversion of the flow at a specially formed edge of the sensor element, as described in German Published Patent Application No. 195 24 634 and U.S. Pat. No. 5,723,784, respectively, prevents the medium flowing in via the gap from getting into a hollow space below the membrane of the sensor element. An application of gluing seams, as described in German Published Patent Application No. 197 43 409, may prevent the penetration of the medium into the gap about the sensor element, in order to avoid unwanted seepage. Disadvantageous in both methods is that only by the special arrangement of gluing seams or by additional measures is the flow diverted around the hollow space in order to compensate for the effects of the manufacturing tolerances.

German Published Patent Application No. 197 44 997 describes a device which makes it possible to protect the components of an evaluation circuit as well as the connecting lines to the contacting region of the sensor element from moisture using a gel, and soiling of the sensor region, thus, the part of the sensor element where a membrane is located, by the gel is prevented. In that case, expansions of a gap, which extends between the sensor element and the walls of the recess, are provided, in order, with the aid of the expansions, to reliably stop a further flow of a protective layer, applied at least partially on the evaluation circuit, in the gap, so that the flow path of the protective layer always remains clearly defined. In this connection, the disadvantages from the standpoint of production engineering result, that gaps must additionally be created, the flow of the gel not being stopped, but rather only being diverted in a defined manner.

German Published Patent Application No. 198 28 629 describes a thermal air-flow sensor in which a carrier housing and a measuring housing are formed separately from one another, and the measuring housing and the carrier housing are cemented on a base plate element.

SUMMARY

In contrast, the device according to the present invention may provide the advantage that in a simple manner, the measuring result may not be impaired even during longer operating time, because the measuring result is not influenced due to a flow under the measuring element by an air stream via an open or clogging folding gap, and according to the present invention, the tolerance of the depth dimension of the recess may be determined only by the tolerance of the sensor cavity, and no longer additionally by the tolerance of the folding gap.

It may be advantageous to secure the sensor carrier in a bypass channel or in a support part, since this simplifies the assembly.

If the sensor carrier is secured to a base member, a sensor element may be connected to electronic equipment prior to insertion into the device. An aerodynamically formed oncoming-flow edge may be advantageous for the oncoming-flow behavior.

For optimized circumflow of the sensor element, the sensor element may be installed flush with respect to a top surface of the sensor carrier, and/or if a small gap is present between the sensor element and the sensor cavity.

Plastic from the plastics class of liquid crystal polymers, or partial crystalline, aromatic thermoplastic may be used.

During assembly, an adhesive bead, which completely seals the sensor region of the sensor element in the sensor cavity, may be placed into the cut-outs in the longitudinal edges of the sensor cavity, transversely over the bottom of the sensor cavity, and depressions may be applied in the edge area of the sensor cavity bottom, so that the sensor element may be mounted more exactly. This adhesive bead prevents soiling of the sensor element by reliably stopping the gel which protects an evaluation circuit from moisture.

It may be advantageous to use plastic for the sensor carrier, since forms of a more filigree nature, and aerodynamic requirements such as those of the oncoming-flow edge may be taken into account by the possibilities for shaping the plastic in any manner desired.

Moreover, it may be advantageous to use plastic or ceramic, since plastic does not corrode so seriously compared to metal, and therefore no further corrosion protection may be necessary.

Since it may be possible to place the sensor element very precisely in the sensor cavity due to the narrowing of the tolerances because of the use of plastic, there may no be longer any flow below the sensor element.

Several example embodiments of the present invention are illustrated schematically in the drawings, and are explained more precisely in the description below.

BRIEF DESCRIPTION OF THE DRAWINGS

FIG. 3a illustrates the sensor carrier, constructed according to the present invention, without the sensor element.

FIG. 3b is a cross-sectional view taken along line A—A in FIG. 3a.

FIG. 4b is a cross-sectional view taken along line B—B in FIG. 4a.

DETAILED DESCRIPTION

Figure 1:
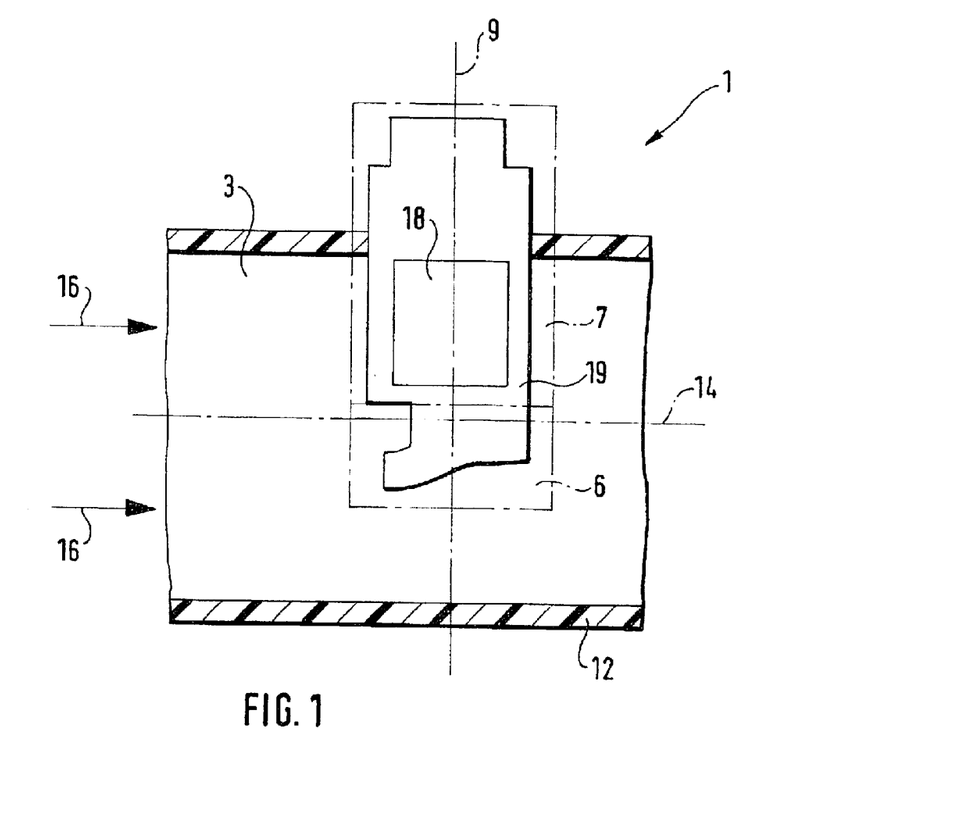
FIG. 1 illustrates a device for determining one parameter of a medium in the installed state.

FIG. 1 illustrates schematically how a device 1 is installed in a line 3 in which a medium to be measured may be flowing. Device 1 may be used for determining at least one parameter of the flowing medium and may be made of a measuring housing 6, denoted by a lower rectangle indicated by a dot-dash line, and a support part 7, denoted by an upper rectangle indicated by a dot-dash line, in which, for example, an evaluation electronics 18 may be accommodated, for instance, on a base support 26 (FIG. 2) in an electronics space 19. Parameters of a flowing medium may be, for example, the volumetric air flow for ascertaining an air mass, a temperature, a pressure, a concentration of a component in the medium or a flow velocity, which may be determined by suitable sensors. It may be possible to use device 1 for determining further parameters. Parameters may be determined using one or more sensors, one sensor also being able to determine two or more parameters. Measuring housing 6 and support part 7 have a common longitudinal axis 9 which, for example, may also be the center axis. Device 1 may be introduced, for example, in a plug-in fashion into a wall 12 of line 3. Wall 12 forms the boundary of a flow cross-section, in the middle of which a center axis 14 extends in the direction of the flowing medium, parallel to wall 12. The direction of the flowing medium, in the following known as the main flow direction, is indicated by corresponding arrows 16, and runs there from left to right.

Figure 2:
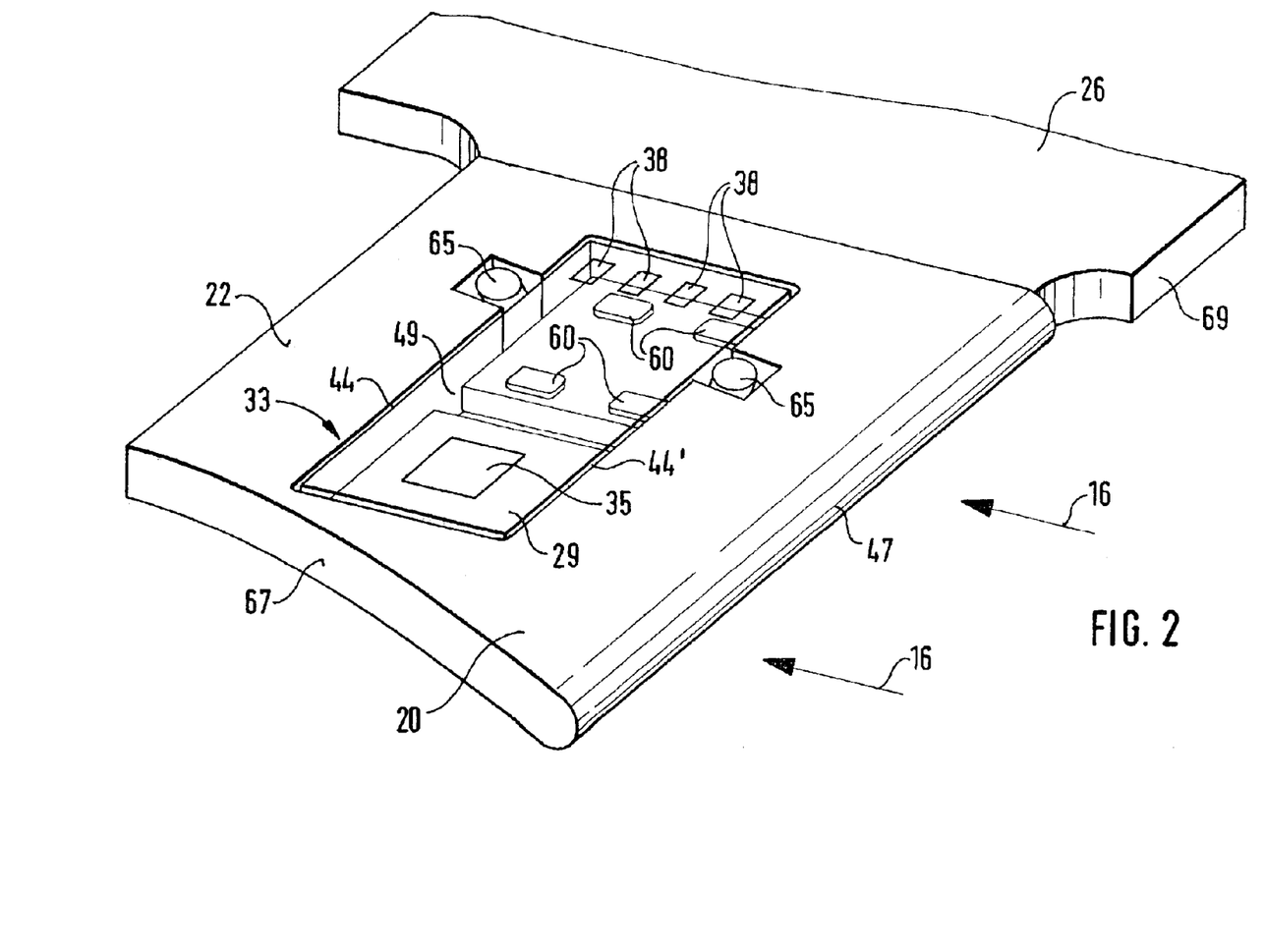
FIG. 2 illustrates a sensor carrier, constructed according to the present invention, with installed sensor element.

FIG. 2 illustrates a sensor carrier 20 including an incorporated sensor element 33. Sensor element 33 is illustrated schematically and partly transparently in FIG. 2, and on a surface facing outwardly, has a membrane 35 which forms the sensor region. On the same surface at the other end of sensor element 33 are contacts 38 which produce the electrical connection to electronic evaluation circuit 18. The arrangement of sensor element 33 and the description of the sensor region are explained in greater detail in German Published Patent Application No. 197 43 409, or in German Published Patent Application No. 43 38 891 and U.S. Pat. No. 5,452,610, respectively, each of which is expressly incorporated herein in its entirely by reference thereto. Sensor element 33 may be arranged in a sensor cavity 29 in such a manner that contacts 38 are closest to base support 26. Here, for example, sensor element 33 is plate-like and is flush with sensor cavity 29. Sensor cavity 29 and sensor element 33 form a gap 44. For example, sensor element 33 and surface 22 of sensor carrier 20 terminate flush.

Figures 3A, 3B:
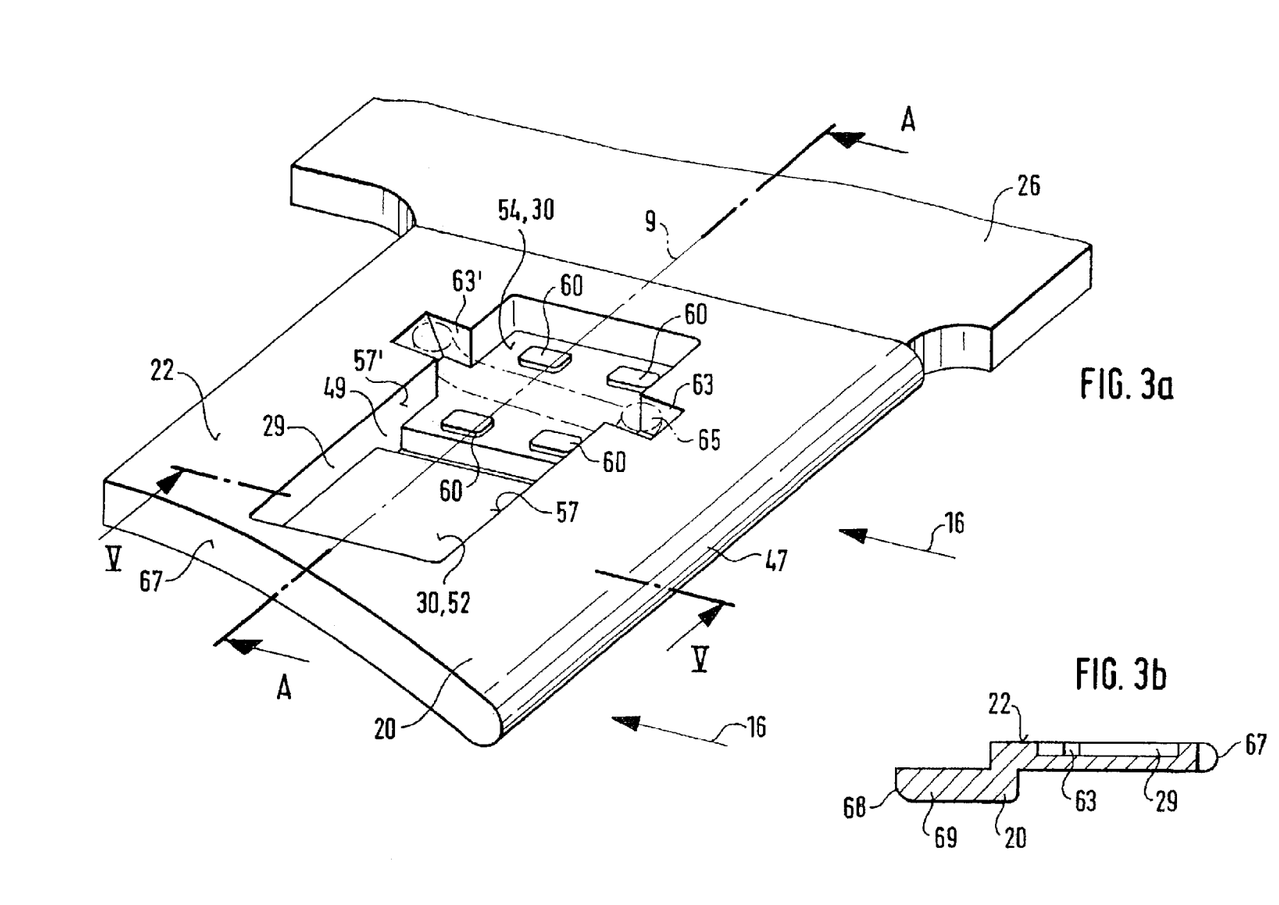

FIG. 3a illustrates sensor carrier 20 which, for example, may be made of plastic. The medium flows past sensor carrier 20 in the direction of arrows 16. In so doing, it strikes on an incoming-flow edge 47 of sensor carrier 20, which, because of the use of plastic, may be formed in a, e.g., filigrain fashion and aerodynamically, e.g., rounded. Sensor cavity 29 including a sensor cavity bottom 30 is arranged on surface 22. Sensor cavity bottom 30 forms a retaining element, edges of sensor cavity 29 forming a frame element. Sensor cavity bottom 30 may be divided, for example, by an adhesive displacement space 49 into a sensor base area 52 and a bearing surface 54. Sensor base area 52 is furthest from base support 26 and is below the sensor region of sensor element 33. Bearing surface 54 is closest to base support 26. For example, adhesive displacement space 49 is a channel straight through from one longitudinal edge 57 to opposite longitudinal edge 57' of sensor cavity 29. Longitudinal edges 57, 57' extend parallel to longitudinal axis 9. However, it may also be possible for adhesive displacement space 49 not to be straight through, i.e., to be shorter. Adhesive displacement space 49 between sensor base area 52 and bearing surface 54 may also, for instance, be formed by at least two depressions in sensor cavity bottom 30. Arranged in bearing surface 54 are, for example, four spacers 60 upon which sensor element 33 rests. Spacers 60 are, for instance, plateau-like. One cut-out 63, 63', for example, is formed in each longitudinal edge 57, 57'. For the gluing process, an adhesive bead 65, illustrated with a dotted line, is applied from cut-out 63 transversely over bearing surface 54 to the other cut-out 63'. After introducing sensor element 33 into sensor cavity 29, sensor base area 52 may be completely protected by adhesive bead 65 from a sensor gel which is applied on an electronic evaluation circuit and creeps in an unwanted manner in the direction of membrane 35. After installation, sensor element 33 is, for example, partly in sensor cavity 29, and rests, for instance, on spacers 60. In this context, sensor element 33 may be glued, for instance, to bearing surface 54 by adhesive bead 65 and terminates along its periphery at the level of surface 22, flush with sensor cavity 29, so that the medium flows scarcely or not at all below sensor element 33 into sensor cavity 29. A gap 44 between sensor element 33 and longitudinal edge 57 of sensor cavity 29 has, for instance, an order of magnitude of a few micrometers. A depth of sensor cavity 29 and the edges of sensor cavity 29 may be formed, for example, in such a manner that a, for instance, plate-like sensor element 33 may be mounted flush with respect to surface 22. The depth dimensions in the region of bearing surface 54 of sensor element 33, starting from surface 22, may be generally toleranced with +/− 10 micrometers. Sensor carrier 20 may be formed in such a manner that surface 22 and the surface opposite it are aligned plane-parallel to one another and in such a manner to main flow direction 16 that a vector of main flow direction 16 is in the plane of the sensor region of sensor element 33. The vector of main flow direction 16 may intersect the plane of the sensor region at a small positive or negative angle. One possibility may be to form a cross-section of sensor carrier 20 perpendicular to surface 22 in a wedge-shape, the thinner end of the wedge arranged in the region of oncoming-flow edge 47, and the vector of main flow direction 16 not arranged in surface 22.

Figure 4A:
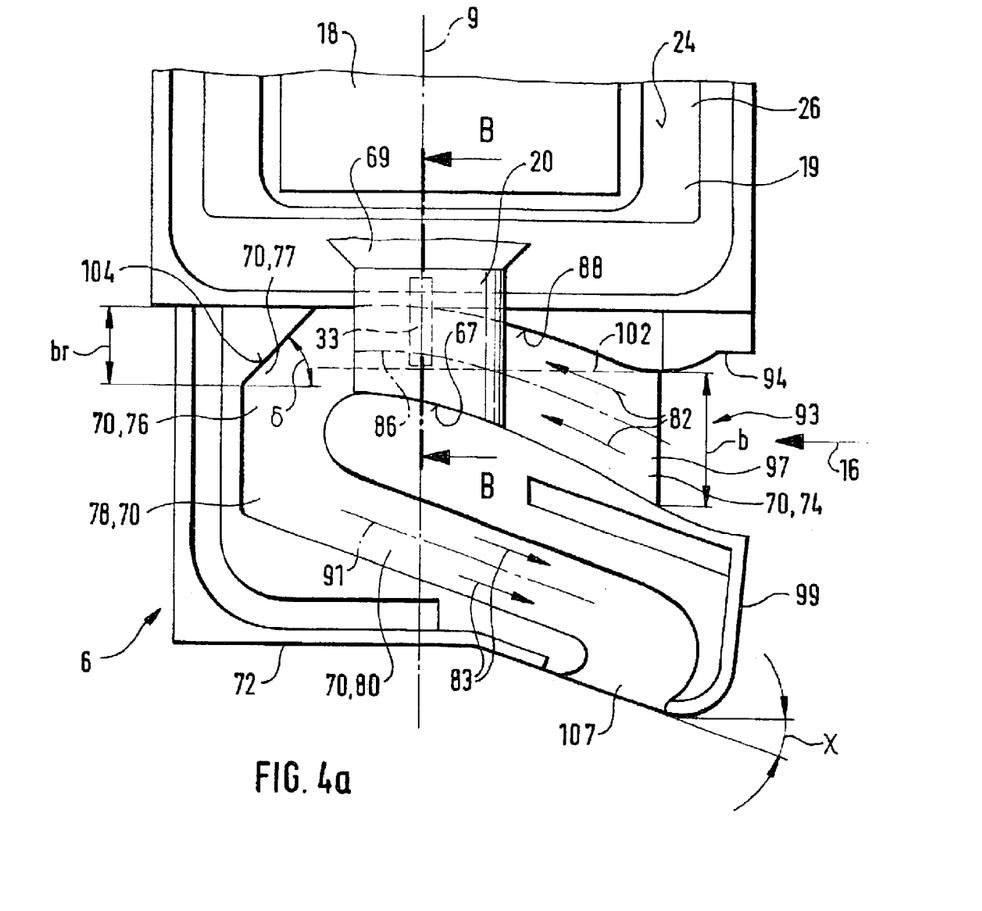
FIG. 4a illustrates a device including a bypass channel into which the sensor carrier is inserted.

FIG. 3b is a cross-sectional view taken along line A—A in FIG. 3a, sensor carrier 20 in this example embodiment having no adhesive displacement space 49 and no spacers 60. A channel end face 67 of sensor carrier 20 joins itself to a wall of a bypass channel 70 (FIG. 4), so that no flowing medium gets between channel end face 67 and the wall of bypass channel 70. An adhesive or packing may provide additional sealing along this contact surface. End 68 opposite channel end face 67 has an insert 69 which may be inserted into a receptacle 73 (FIG. 4b) in the region of electronics space 19 and may be connected there by, for example, press-fit or adhesive.

FIG. 4a illustrates measuring housing 6 including bypass channel 70, and support part 7 without a cover closing bypass channel 70. Bypass channel 70 is formed by a base part 72 and the cover. Main flow direction 16 of the medium is indicated by arrows. Bypass channel 70 may be made, for example, of an inlet channel 74 or measuring channel 74, a diverting channel 76, which may be divided into a first part 77 and a second part 78, and an outlet channel 80. Flow direction 82, 83 in inlet channel 74 and outlet channel 80 is indicated by arrows. Inlet-channel center line 86 is curved, since boundary surfaces 88 of inlet channel 74 are streamlined. Outlet-channel center line 91 is, for example, a straight line.

In front region 39 of bypass channel 70, in front of an inlet port 97 through which the medium flows in, a flow obstacle 94, for example, may be provided which effects a defined flow separation effective for the measuring channel. This is explained in greater detail in German Published Patent Application No. 44 41 874, which is expressly incorporated herein in its entirety by reference thereto.

A nose 99 of measuring housing 6 may be formed, for example, in such a manner that solid or liquid particles striking it are reflected away from inlet port 97. To this end, nose 99 is inclined, directed away from support part 7.

A surface 102, drawn in with a dotted line, which extends parallel to main flow direction 16, forms, together with the boundary surface of inlet channel 74 facing support part 7, a screened area into which only a few or no dirt particles or fluids get.

In first part 77 of diverting channel 76, for instance, a boundary surface 104 is inclined by an angle δ contrary to main flow direction 16. Angle δ may be in a range of approximately 30 to 60 degrees, e.g., about 45 degrees. The influence of this formation is described in greater detail in German Published Patent Application No. 196 23 334, which is expressly incorporated herein in its entirety by reference thereto. Boundary surface 104 has a depth tr and a width br extending perpendicular thereto, which corresponds to at least $\frac{2}{3}$ of width b of inlet port 97 of inlet channel 74. Depth tr may correspond approximately to depth t of measuring channel 70 perpendicular to its width b at inlet port 97. However, it may also be possible to form boundary surface 104 with a depth tr which is somewhat less than depth t of inlet port 97 of inlet channel 74. Contiguous to boundary surface 104, the wall of first section 77 extends approximately in the direction of longitudinal axis 9.

At the end of outlet channel 80 is an outlet port 107, the surface of which forms an angle X with main flow direction 16, and through which the medium leaves the measuring channel. For example, outlet port 107 has a larger cross-section than outlet channel 80, the pulsation properties thereby being improved. Sensor carrier 20 projects into bypass channel 70, e.g., into inlet channel 74 which forms the measuring channel.

Sensor element 33 is accommodated in sensor carrier 20 and may be arranged in the shaded region of inlet channel 74. The arrangement of such a measuring element 10 is described, for example, German Published Patent Application No. 195 24 634, which is expressly incorporated herein in its entirety by reference thereto.

Electronic equipment 18, which may be used for evaluation and control of the sensor element, is disposed in electronics space 19 which is part of support part 7.

Figure 4B:
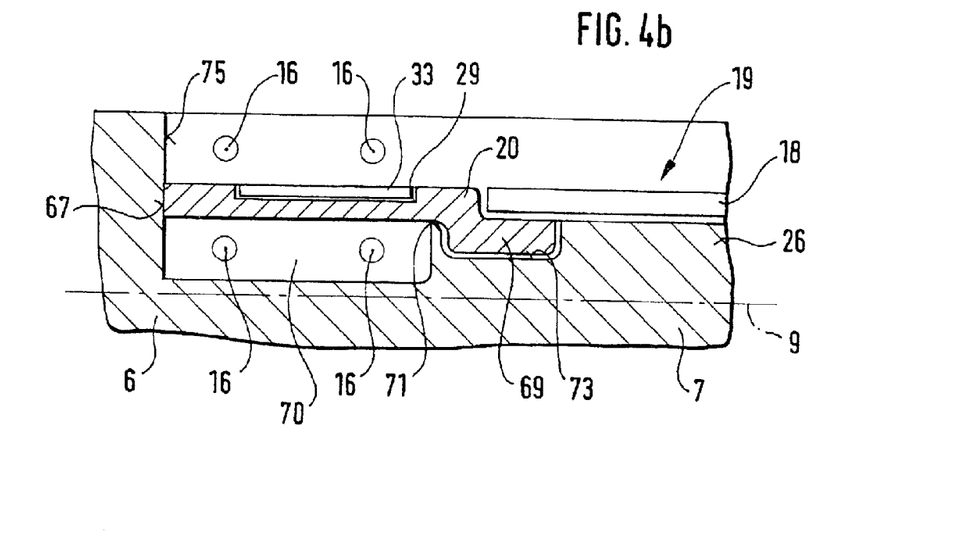

FIG. 4b is a cross-sectional view taken along line B—B of FIG. 4a. Sensor carrier 20 is inserted into a receptacle 73 and is secured there by press-fit or adhesive. If adhesive is used, it simultaneously seals a junction region 71 between bypass channel 70 and electronics space 19. Receptacle 73 may be arranged in bypass channel 70, in support part 7 or in between. A side wall 75 of bypass channel 70 is facing away from support part 7, and longitudinal axis 9 forms an angle of intersection with side wall 75 which is markedly different from zero. Channel end face 67 adapts with form accuracy to side wall 75 of bypass channel 70, so that no seepage occurs there. This may be additionally ensured by applying adhesive or sealing compound there.

Electronic equipment 18 may be arranged, for example, on a base support 26 and may be coated with a protective gel. Sensor carrier 20 may also be glued to base support 26.

Figure 5:
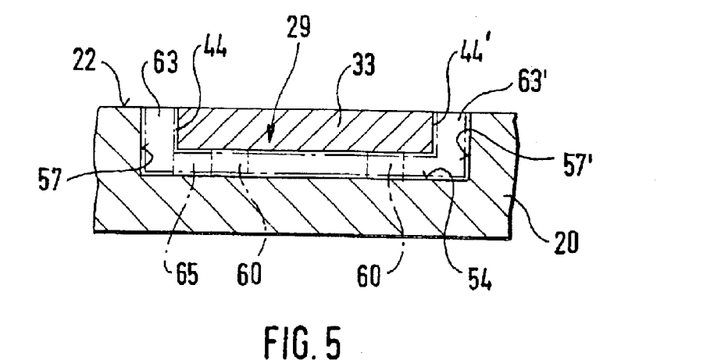
FIG. 5 is a cross-sectional view taken along line V—V in FIG. 3.

FIG. 5 is a cross-sectional view taken along line V—V in FIG. 3 through sensor carrier 20 with inserted sensor element 33 and adhesive bead 65 (indicated with a dotted line). For example, adhesive bead 65 was placed from cut-out 63 at longitudinal edge 57, across bearing surface 54, to cut-out 63' at longitudinal edge 57'. After the insertion of sensor element 33 into sensor cavity 29, adhesive is pressed, for instance, into adhesive displacement space 49 and through gaps 44, 44' outwardly, and reaches up to surface 22. The adhesive completely closes gap 44 between sensor element 33 and sensor cavity 29 at the one longitudinal edge 57, passing through below sensor element 33 to the other longitudinal edge 57', and gap 44', so that soiling of sensor element 33 with its membrane 35 is prevented by a reliable stop of the creeping protective gel of evaluation circuit 18.

Figure 6A:
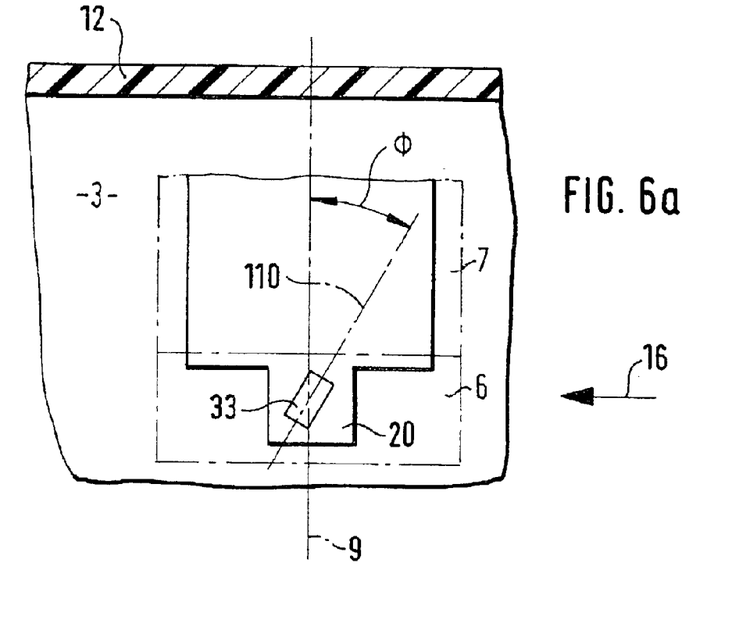
FIGS. 6a and FIG. 6b illustrate various arrangements of the sensor carrier and sensor element.
Figure 6B:
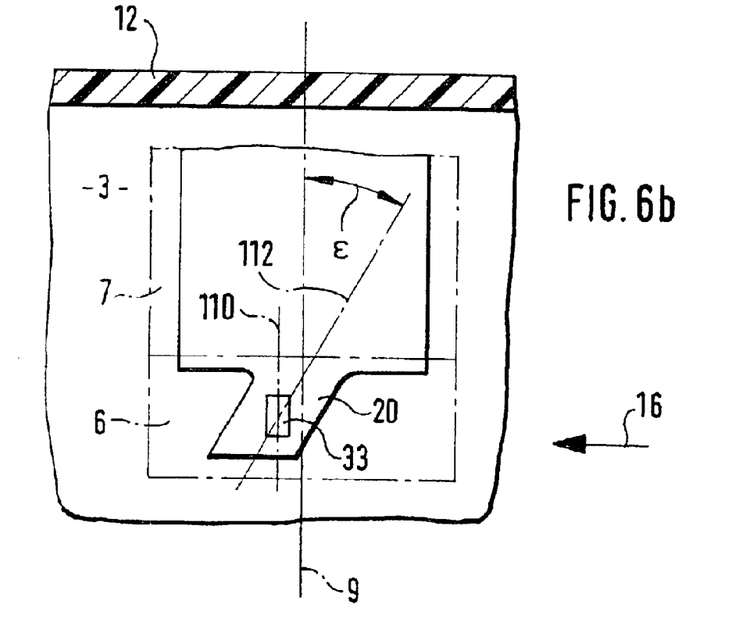

FIGS. 6a and 6b illustrate various arrangements of sensor carrier 20 and sensor element 33 within measuring housing 6, which is indicated by a dotted line. In FIG. 4a, sensor carrier 20 is arranged as follows: A longitudinal axis 9 of sensor carrier 20 is perpendicular to main flow direction 16, and a longitudinal axis of sensor element 33 extends parallel to longitudinal axis 9. In FIG. 6a, however, sensor element 33 is arranged in sensor carrier 20 with its longitudinal axis 110 inclined by an angle Φ with respect to longitudinal axis 9. In FIG. 6b, a longitudinal axis 112 of sensor carrier 20 is arranged inclined by an angle ε with respect to longitudinal axis 9. Longitudinal axis 110 of sensor element 33 extends parallel to longitudinal axis 9. The oncoming-flow and circumflow properties of sensor element 33 and of sensor carrier 20 may be further improved using these arrangements. Furthermore, an orientation of sensor element 33 with respect to main flow direction 16 may thereby be adjusted.

What is claimed is:

1. A device for determining at least one parameter of a medium flowing in a line, comprising:
   a sensor carrier including a sensor cavity;
   at least one sensor element arranged on the sensor carrier in the sensor cavity, the sensor element configured to be introduced into the flowing medium and to determine the parameter;
   wherein the sensor carrier is a separate component secured in the device; and
   wherein the sensor carrier is made of at least one of plastic and ceramic.

2. The device according to claim 1, further comprising:
   a support part; and
   a measuring housing provided in the line and joined to the support part, the measuring housing including a bypass channel, the sensor element arranged in the bypass channel, the sensor carrier secured in the bypass channel.

3. The device according to claim 1, further comprising:
   a support part, the sensor carrier secured in the support part; and
   a measuring housing provided in the line and joined to the support part, the measuring housing including a bypass channel, the sensor element arranged in the bypass channel.

4. The device according to claim 1, further comprising:
   a support part, a base support arranged in the support part, the sensor carrier secured to the base support; and
   a measuring housing provided in the line and joined to the support part, the measuring housing including a bypass channel, the sensor element arranged in the bypass channel.

5. The device according to claim 1, wherein the sensor carrier includes an aerodynamically formed oncoming-flow edge directed contrary to the flowing medium.

6. The device according to claim 1, wherein the sensor cavity forms a frame element and retaining element for the sensor element and includes a sensor cavity bottom.

7. The device according to claim 6, wherein the sensor carrier includes a surface in which the sensor cavity is located, the surface arranged approximately at a same level as a bottom of the base support.

8. The device according to claim 6, wherein the sensor carrier includes a surface in which the sensor cavity is located, dimensions of the sensor cavity corresponding at a level of the surface of the sensor carrier approximately to dimensions of the sensor element so that the sensor element is configured to be introduced flush into the sensor cavity and so that the medium flows one of scarcely and not at all below the sensor element into the sensor cavity.

9. The device according to claim 6, wherein the sensor cavity includes two opposite longitudinal edges, a gap having an order of magnitude of a few micrometers formed between a periphery of the sensor element and the longitudinal edges.

10. The device according to claim 6, wherein the sensor carrier includes a surface in which the sensor cavity is located, dimensions of the sensor cavity corresponding approximately to dimensions of the sensor element so that the sensor element is flush with respect to the surface of the sensor carrier.

11. The device according to claim 6, wherein the sensor element is glued to the sensor cavity bottom.

12. The device according to claim 11, wherein the adhesive is configured to seal the bypass channel and the electronics space.

13. The device according to claim 11, wherein a channel end face of the sensor carrier adjoins the bypass channel by form locking.

14. The device according to claim 6, wherein at least one adhesive displacement space is configured in the sensor cavity bottom as a channel that extends in a direction from one longitudinal edge of the sensor cavity bottom arranged parallel an oncoming-flow edge of the sensor cavity to an opposite longitudinal edge, the adhesive displacement space configured so that adhesive introduced into the sensor cavity is spread upon insertion of the sensor element into the sensor cavity of the sensor carrier, the channel dividing the sensor cavity bottom into a bearing surface configured to receive adhesive and a sensor base area arranged below a membrane of the sensor element.

15. The device according to claim 6, further comprising at least one spacer in the form of an elevation arranged in the sensor cavity bottom of the sensor cavity.

16. The device according to claim 1, wherein the medium flows in a main flow direction, the sensor carrier one of (a) formed and (b) aligned with respect to the main flow direction of the flowing medium so that a vector of the main flow direction one of (a) is in a plane of a sensor region of the sensor element and (b) intersects the plane of the sensor region at one of (a) small positive and (b) a negative angle.

17. The device according to claim 1, further comprising:
   a support part; and
   a measuring housing provided in the line and joined to the support part, a common longitudinal axis of the support part and the measuring housing extending perpendicular to a main flow direction, the measuring housing including a bypass channel extending from an inlet port and an inlet channel, a diverting channel adjoined to the inlet channel and configured so that the medium flows from the inlet channel into the diverting channel, via an outlet channel to an outlet port to discharge at an outer surface of the measuring housing into the line.

18. The device according to claim 1, wherein the plastic includes one of a liquid crystal polymer and a partial crystalline, aromatic thermoplastic.

19. The device according to claim 1, wherein at least one of a longitudinal axis of the sensor carrier is inclined by an angle and a longitudinal axis of the sensor element is inclined by an angle with respect to a longitudinal axis of the support part.

20. The device according to claim 1, wherein the sensor carrier is secured in the device by an adhesive.

21. The device according to claim 1, wherein the sensor carrier is secured in the device by a press-fit.

22. The device according to claim 1, wherein the medium includes intake air of an internal combustion engine.

23. A device for determining at least one parameter of a medium flowing in a line, comprising:

a sensor carrier;

at least one sensor element arranged on the sensor carrier, the sensor element configured to be introduced into the flowing medium and to determine the parameter;

wherein the sensor carrier is a separate component secured in the device;

wherein the sensor carrier includes a sensor cavity, the sensor element disposed in the sensor cavity, the sensor cavity forming a frame element and retaining element for the sensor element and including a sensor cavity bottom;

wherein at least one adhesive displacement space is configured in the sensor cavity bottom as a channel that extends in a direction from one longitudinal edge of the sensor cavity bottom arranged parallel an oncoming-flow edge of the sensor cavity to an opposite longitudinal edge, the adhesive displacement space configured so that adhesive introduced into the sensor cavity is spread upon insertion of the sensor element into the sensor cavity of the sensor carrier, the channel dividing the sensor cavity bottom into a bearing surface configured to receive adhesive and a sensor base area arranged below a membrane of the sensor element; and wherein a cut-out is arranged in each longitudinal edge of the sensor cavity in a region of the bearing surface, the longitudinal edges one of arranged parallel and slightly inclined with respect to the oncoming-flow edge of the sensor carrier, the cut-out configured so that an adhesive bead applied therein is forced out upon insertion of the sensor element into the sensor cavity so that a gap between the sensor element and the sensor cavity at the one longitudinal edge, a gap contiguous thereto between the sensor element and the bearing surface and a gap contiguous thereto at the opposite longitudinal edge are completely closed by the adhesive of the adhesive bead.

24. The device according to claim 23, further comprising:

a cover;

a dividing wall connected to the cover and extending with a free end to the surface of the sensor carrier, the cut-outs in the longitudinal edges of the sensor cavity extending in a direction of the dividing wall and are at least partially covered by the dividing wall.

* * * * *